(12) United States Patent
Li et al.

(10) Patent No.: US 7,724,858 B2
(45) Date of Patent: May 25, 2010

(54) TECHNIQUES TO MANAGE LATENCY FOR MULTIPLE RECEIVERS

(75) Inventors: Qinghua Li, Sunnyvale, CA (US); Xintian E. Lin, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 1574 days.

(21) Appl. No.: 10/999,620

(22) Filed: Nov. 29, 2004

(65) Prior Publication Data
US 2006/0114975 A1 Jun. 1, 2006

(51) Int. Cl.
*H04L 7/00* (2006.01)
*H04L 7/02* (2006.01)

(52) U.S. Cl. .................... 375/358; 375/359; 375/265

(58) Field of Classification Search .............. 375/219, 375/220, 136, 144, 147–148, 242, 246, 253, 375/260, 262, 267, 299, 316, 341; 714/749, 714/759, 794, 800, 795; 455/39, 69, 70, 455/73, 132, 500, 3.07, 517; 370/57, 69.1, 370/120, 281, 295, 302, 343, 480, 482, 252, 370/278, 282, 430; 340/7.22
See application file for complete search history.

(56) References Cited

U.S. PATENT DOCUMENTS

| | | | |
|---|---|---|---|
| 5,991,053 A * | 11/1999 | Matsuo et al. ............ 358/468 |
| 7,225,383 B1 * | 5/2007 | Wood et al. ............... 714/749 |
| 7,315,527 B2 * | 1/2008 | Wei et al. .................. 370/328 |
| 7,499,417 B2 * | 3/2009 | Kim et al. .................. 370/310 |
| 2002/0165973 A1 * | 11/2002 | Ben-Yehezkel et al. ..... 709/230 |
| 2003/0140296 A1 * | 7/2003 | Odman ....................... 714/749 |
| 2004/0001429 A1 * | 1/2004 | Ma et al. .................... 370/210 |
| 2004/0082294 A1 * | 4/2004 | Ekl et al. .................. 455/3.05 |
| 2004/0093548 A1 * | 5/2004 | Heo et al. ................. 714/749 |
| 2004/0151146 A1 * | 8/2004 | Hammerschmidt ........ 370/338 |
| 2005/0074007 A1 * | 4/2005 | Samuels et al. ........... 370/392 |
| 2005/0088990 A1 * | 4/2005 | Gibbons et al. ........... 370/329 |
| 2005/0105504 A1 * | 5/2005 | Sakoda ....................... 370/349 |
| 2005/0135318 A1 * | 6/2005 | Walton et al. .............. 370/338 |
| 2005/0204247 A1 * | 9/2005 | Guo et al. .................. 714/746 |
| 2005/0213540 A1 * | 9/2005 | Matsumoto ................ 370/331 |
| 2006/0067263 A1 * | 3/2006 | Li et al. ..................... 370/315 |
| 2006/0165029 A1 * | 7/2006 | Melpignano et al. ...... 370/328 |

FOREIGN PATENT DOCUMENTS

| WO | 03/013067 A1 | 2/2003 |
|---|---|---|
| WO | WO 03/013067 A1 * | 2/2003 |
| WO | 2004/062133 A1 | 7/2004 |

OTHER PUBLICATIONS

PCT International Search Report, International Application No. PCT/US2005/042279, Date of Mailing of the International Search Report: Jun. 2, 2006, pp. 1-4.

* cited by examiner

*Primary Examiner*—Tesfaldet Bocure
*Assistant Examiner*—Lawrence B Williams
(74) *Attorney, Agent, or Firm*—Kacvinsky LLC (57) ABSTRACT

Method and apparatus to manage delay for multiple receivers for a wireless system are described.

39 Claims, 8 Drawing Sheets

TECHNIQUES TO MANAGE LATENCY FOR MULTIPLE RECEIVERS

BACKGROUND

In a wireless communication system, wireless communication devices may transmit and/or receive radio frequency (RF) signals through one or more antennas. Some wireless communication devices may include multiple antennas. The wireless communication devices with multiple antennas may include a multiple-input-multiple-output (MIMO) modulation and/or coding system to control receiving and transmitting of RF signals through the multiple antennas. Techniques to improve control and management of a MIMO system may improve overall system performance.

DETAILED DESCRIPTION

Figure 1:
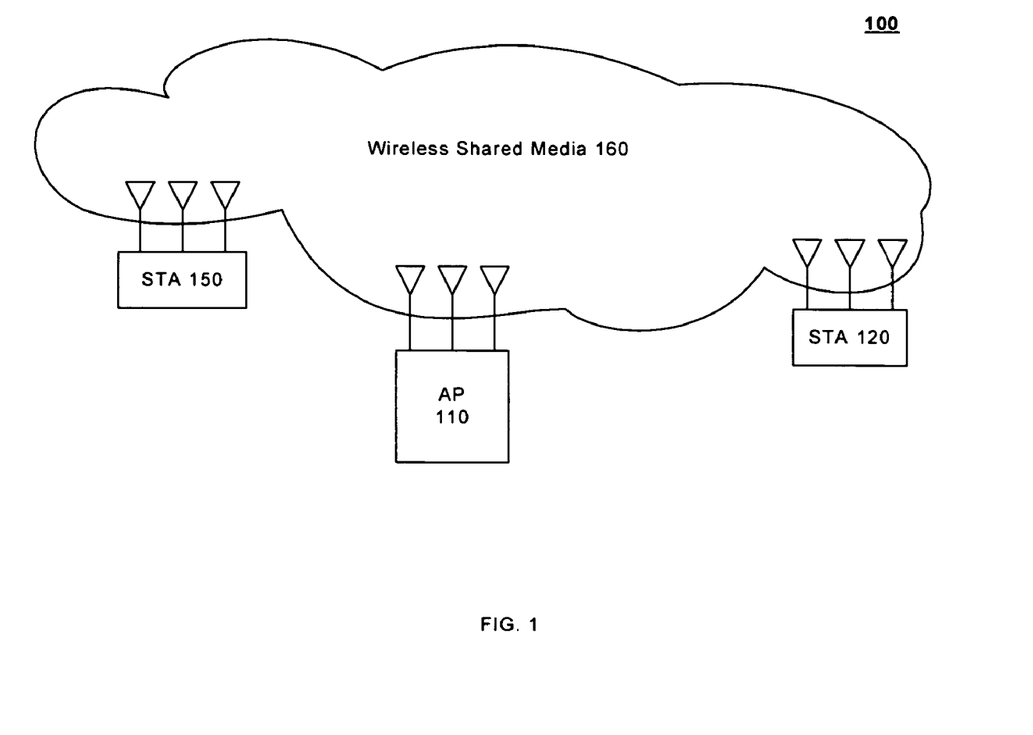
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may operate in accordance with the IEEE 802.11 wireless local area network (WLAN) series of standard protocols, such as the IEEE 802.11n, 2004 proposed standard ("802.11n Proposed Standard"). In another example, system 100 may operate in accordance with the IEEE 802.16 and 802.20 series of standard protocols. The embodiments are not limited in this context.

Referring again to FIG. 1, system 100 may comprise a wireless communication system operating in accordance with, for example, the IEEE 802.11 series of protocols. System 100 may include an access point (AP) 110, a station (STA) 120, and a STA 150, all arranged to communicate information signals using wireless shared media 160. Information signals may include any type of signal encoded with information, such as media and/or control information. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may comprise AP 110. AP 110 may comprise a wireless access point for a network, such as a WLAN. In one embodiment, for example, AP 110 may be implemented as a high throughput (HT) wireless device arranged to operate in accordance with the IEEE-802.1 1n Proposed Standard. AP 110 may include a MIMO system having multiple transmitters/receivers ("transceivers") and multiple antennas. The embodiments are not limited in this context.

In one embodiment, system 100 may comprise STA 120 and STA 150. STA 120 and 150 may each be implemented as, for example, a wireless communication device, such as mobile or cellular telephone, a computer or laptop equipped with a wireless access card, a handheld device such as a wireless PDA, an integrated cellular telephone/PDA, and so forth. The embodiments are not limited in this context.

In one embodiment, for example, STA 120 and STA 150 may be implemented as HT wireless devices arranged to operate in accordance with the IEEE-802.11n Proposed Standard. STA 120 and STA 150 may each include a MIMO system having at least two transceivers and two antennas. The MIMO system, however, may have any number of transceivers and antennas, and the embodiments are not limited in this context.

In general operation, the nodes of system 100 may operate in multiple operating modes. For example, STA 120, STA 150 and AP 110 may operate in at least one of the following operating modes: a single-input-single-output (SISO) mode, a multiple-input-single-output (MISO) mode, a single-input-multiple-output (SIMO) mode, and/or in a MIMO mode. In a SISO operating mode, a single transmitter and a single receiver may be used to communicate information signals over a wireless shared medium 160. In a MISO operating mode, two or more transmitters may transmit information signals over wireless shared media 160, and information signals may be received from wireless shared media 160 by a single receiver of a MIMO system. In a SIMO operating mode, one transmitter and two or more receivers may be used to communicate information signals over wireless shared media. In a MIMO operating mode, two or more transmitters and two or more receivers may be used to communicate information signals over wireless shared media 160.

In one embodiment, the nodes of system 100 may use open loop MIMO techniques. An open loop MIMO system typically uses a simpler protocol and less overhead than a closed loop MIMO system. An open loop MIMO system, however, may suffer from interference between spatial streams and thus may have a shorter range than closed loop systems. Iterative demodulation or "turbo equalization" is an example of a technique typically employed to compensate for the interference. Iterative demodulation may mitigate some of the interference for an open loop system, and potentially delivers 2-3 decibel (dB) gains relative to conventional minimum mean-squared error (MMSE) and zero-forcing receivers.

Iterative demodulation, however, may create receiver latency or delay problems in a MIMO system. For example, AP 110 may transmit a packet of information to one of STA 120 and/or STA 150. AP 110 may then wait for an acknowledgement message from the receiving station(s). If an acknowledgment message is not received within a certain time interval, referred to herein as a "delay interval," AP 110 assumes the packet was not properly received and retransmits the packet. Consequently, if STA 120 and/or STA 150 are arranged to use iterative demodulation, a case may occur where AP 110 is retransmitting packets even though they may have been properly received by STA 120 and/or STA 150. This may result in an unnecessary use of system resources, thereby reducing system performance and efficiency.

Some embodiments may solve this and other problems. In one embodiment, for example, AP 110, STA 120 and/or STA 150 may employ one or more techniques to extend the delay interval for receiving a packet. By extending the delay interval, the receiving device may have more time to receive a packet. More particularly, the receiving device may be arranged to use iterative demodulation to receive a packet. The extended delay interval may provide the receiving device more time to perform the iterative demodulation needed to receive the packet, while reducing the possibility that the transmitting device unnecessarily retransmits the packet.

Figure 2:
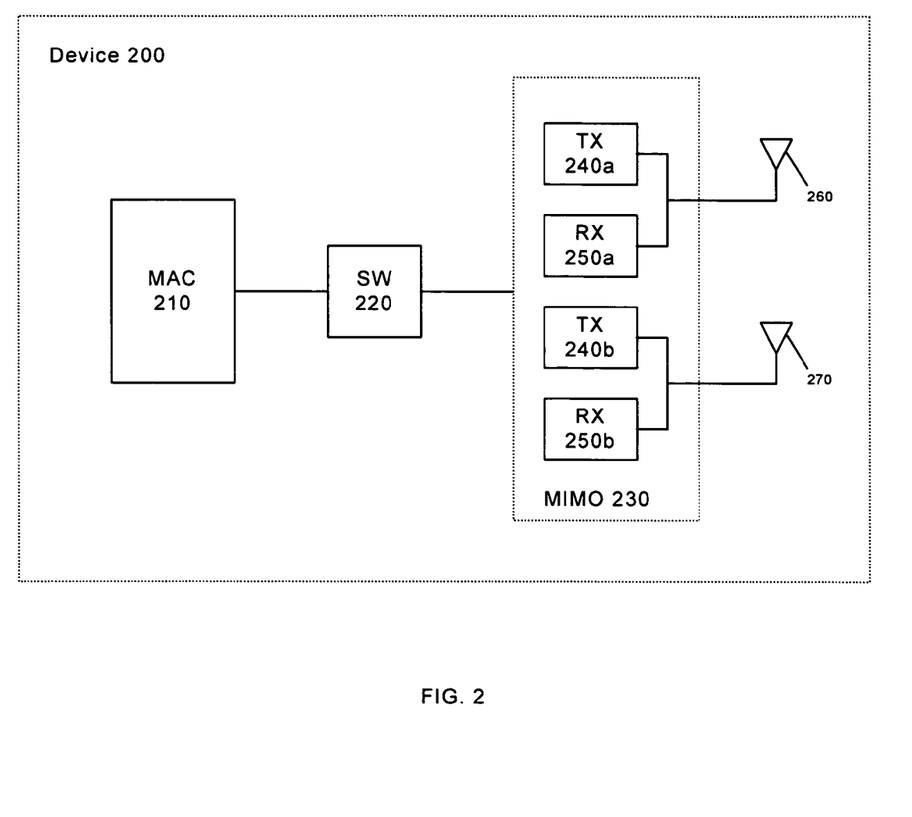
FIG. 2 illustrates a partial block diagram of a node 200.

FIG. 2 illustrates a partial block diagram of a node 200. Node 200 may be implemented as part of AP 110, STA 120 and/or STA 150 as described with reference to FIG. 1. As shown in FIG. 2, node 200 may comprise multiple elements, such as processor 210, switch (SW) 220, and a transceiver array 230. Some elements may be implemented using, for example, one or more circuits, components, registers, processors, software subroutines, or any combination thereof. Although FIG. 2 shows a limited number of elements, it can be appreciated that more or less elements may be used in node 200 as desired for a given implementation. The embodiments are not limited in this context.

In one embodiment, node 200 may include a transceiver array 230. Transceiver array 230 may be implemented as, for example, a MIMO system. MIMO system 230 may include two transmitters 240*a* and 240*b*, and two receivers 250*a* and 250*b*. Although MIMO system 230 is shown with a limited number of transmitters and receivers, it may be appreciated that MIMO system 230 may include any desired number of transmitters and receivers. The embodiments are not limited in this context.

In one embodiment, transmitters 240*a-b* and receivers 250*a-b* of MIMO system 230 may be implemented as Orthogonal Frequency Division Multiplexing (OFDM) transmitters and receivers. Transmitters 240*a-b* and receivers 250*a-b* may communicate data frames with other wireless devices. For example, when implemented as part of AP 110, transmitters 240*a-b* and receivers 250*a-b* may communicate data frames with STA 120 and STA 150. When implemented as part of STA 120 and/or STA 150, transmitters 240*a-b* and receivers 250*a-b* may communicate data frames with AP 110. The data frames may be modulated in accordance with a number of modulation schemes, to include Binary Phase Shift Keying (BPSK), Quadrature Phase-Shift Keying (QPSK), Quadrature Amplitude Modulation (QAM), 16-QAM, 64-QAM, and so forth. The embodiments are not limited in this context.

In one embodiment, transmitter 240*a* and receiver 250*a* may be operably coupled to an antenna 260, and transmitter 240*b* and receiver 250*b* may be operably coupled to antenna 270. Examples for antenna 260 and/or antenna 270 may include an internal antenna, an omni-directional antenna, a monopole antenna, a dipole antenna, an end fed antenna or a circularly polarized antenna, a micro-strip antenna, a diversity antenna, a dual antenna, an antenna array, and so forth. The embodiments are not limited in this context.

In one embodiment, node 200 may include a processor 210. Processor 210 may be implemented as a general purpose processor, such as a processor made by Intel® Corporation, for example. Processor 210 may also comprise a dedicated processor, such as a controller, microcontroller, embedded processor, a digital signal processor (DSP), a network processor, an input/output (I/O) processor, and so forth. The embodiments are not limited in this context.

In one embodiment, processor 210 may include, or be connected to, a memory unit (not shown). The memory unit may comprise any machine-readable media. Some examples of machine-readable media include, but are not necessarily limited to, read-only memory (ROM), random-access memory (RAM), dynamic RAM (DRAM), double DRAM (DDRAM), synchronous RAM (SRAM), programmable ROM, erasable programmable ROM, electronically erasable programmable ROM, flash memory, a polymer memory such as ferroelectric polymer memory, an ovonic memory, magnetic disk (e.g., floppy disk and hard drive), optical disk (e.g., CD-ROM and DVD), and so forth. The embodiments are not limited in this context.

In one embodiment, for example, processor 210 may be arranged to perform MAC layer and/or physical (PHY) layer operations. For example, processor 210 may be implemented as a media access control (MAC) processor. MAC 210 may be arranged to perform MAC layer processing operations. In addition, MAC 210 may be arranged to extend a delay interval to receive a packet. More particularly, when node 200 is implemented as part of STA 120 and/or STA 150, MAC 210 may receive a data packet from AP 110. MAC 210 may cause MIMO system 230 to extend a delay interval for an acknowledgement message to be sent in response to the packet. This may form an extended delay interval for an acknowledgement message to be sent in response to the packet. The amount of additional time offered by the extended delay interval may allow receivers 250*a-b* sufficient time to receive the packet using iterative demodulation, for example. The embodiments are not limited in this context.

In general operation, assume node 200 is implemented as part of a receiving device, such as STA 120 and/or STA 150. AP 110 may transmit or send information to the receiving device. The information may comprise, for example, one or more packets, with each packet comprising media information and/or control information. The media and/or control information may be represented using, for example, multiple OFDM symbols. A packet in this context may refer to any discrete set of information, including a unit, frame, cell, segment, fragment, and so forth. The packet may be of any size suitable for a given implementation. The embodiments are not limited in this context.

Once AP 110 sends a packet to the receiving device, AP 110 waits to receive an acknowledgement message from the receiving device indicating that the information has been successfully received. For example, receivers 250*a-b* of transceiver array 230 may receive the information from AP 110. MAC 210 of node 200 typically is given a determined delay interval to acknowledge receipt of the transmitted packet. The delay interval may comprise any determined amount or interval of time. For example, the delay interval may typically comprise an amount of time allocated for a short interframe spacing (SIFS) as defined by the IEEE 802.11a specification, which is approximately 16 microseconds (μs). If AP 110 fails to receive the acknowledgement message within the determined delay interval, AP 110 assumes the packet has not been properly received by node 200, and retransmits the packet accordingly.

Since receivers 250a-b are arranged to receive the packet using iterative demodulation, however, the initially allocated delay interval may comprise an insufficient amount of time to receive the complete packet and send the appropriate acknowledgement message to AP 110. Consequently, node 200 may attempt to extend the delay interval to allow an acknowledgement message to be sent in response to the packet before AP 110 retransmits the packet. Node 200 may accomplish this using a number of different techniques, which may be described in more detail with reference to FIGS. 3-8.

Figure 3:
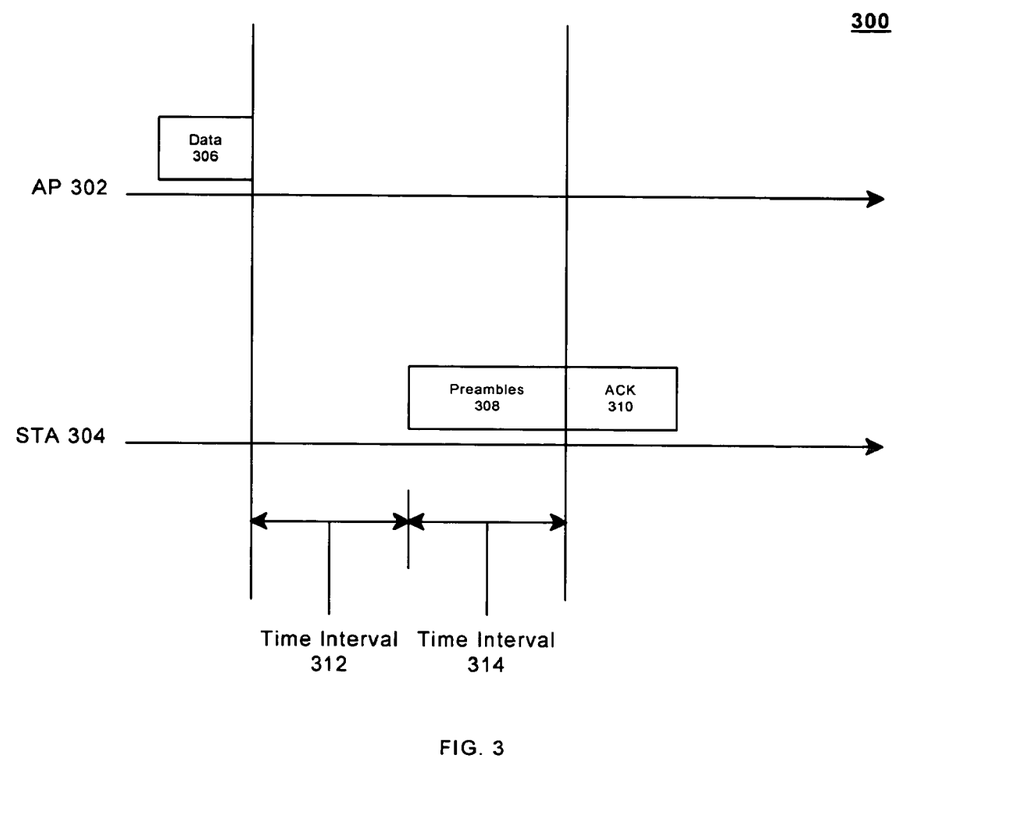
FIG. 3 illustrates a timing diagram 300.

FIG. 3 illustrates a timing diagram 300. Timing diagram 300 may illustrate the communication of information between an AP 302 and STA 304. AP 302 may be representative of, for example, AP 110. STA 304 may be representative of, for example, STA 120 and/or STA 150. As shown in timing diagram 300, AP 302 may send a packet to STA 304. The packet may comprise, for example, a data unit 306. Once AP 302 sends data unit 306, it starts a timer. If the value of the timer reaches a determined delay interval, as represented by time interval 312, before an acknowledgement message (ACK) 310 is received by AP 302 from STA 304, AP 302 may assume that STA 304 has not properly received data unit 306 and therefore retransmits the packet. This may occur even though STA 304 has not yet finished receiving the original data unit 306. As a result, AP 302 may unnecessarily retransmit data unit 306 to STA 304.

To reduce the possibility of AP 302 unnecessarily retransmitting data unit 306, STA 304 may attempt to extend or increase the delay interval to form an extended delay interval. The delay interval may be extended by any amount of time, as represented by time interval 314. STA 304 may accomplish this by, for example, sending one or more preambles 308 for ACK 310 during time interval 312. STA 304 may begin sending preambles 308 during time interval 312 even though data unit 306 has not yet been fully received and verified by STA 304.

In one embodiment, preambles 308 may comprise any preamble suitable for use in a wireless system. A preamble may comprise, for example, one or more training symbols used for a number of different applications, such as channel estimation, signal detection, automatic gain control, diversity selection, frequency offset estimation, timing synchronization, and so forth. Preambles 308 may comprise, for example, a long or short preamble as defined by the IEEE 802.11n Proposed Standard. The embodiments are not limited in this context.

Referring again to FIG. 3, AP 302 may begin receiving preambles 308 from STA 304. AP 302 may receive preambles 308 in anticipation of receiving ACK 310, and therefore may defer retransmitting data unit 306 by an amount of time represented by time interval 314. This may give STA 304 additional time to receive data unit 306 using iterative demodulation techniques. In one embodiment, for example, time interval 312 may comprise an initially allocated delay interval of approximately 16 μs, while time interval 314 may comprise an additional approximately 16 μs, thereby providing an extended delay interval of approximately 32 μs (e.g., time interval 312 plus time interval 314). The embodiments are not limited in this context.

If STA 304 properly receives the complete data unit 306 during time interval 314, STA 304 may send ACK 310. If STA 304 fails to receive the complete data unit 306 during time interval 314, however, STA 304 may refrain from sending ACK 310. If AP 302 fails to receive ACK 310 after receiving preambles 308, AP 302 may assume that data unit 306 has not been properly received by STA 304, and may retransmit data unit 306.

Figure 4:
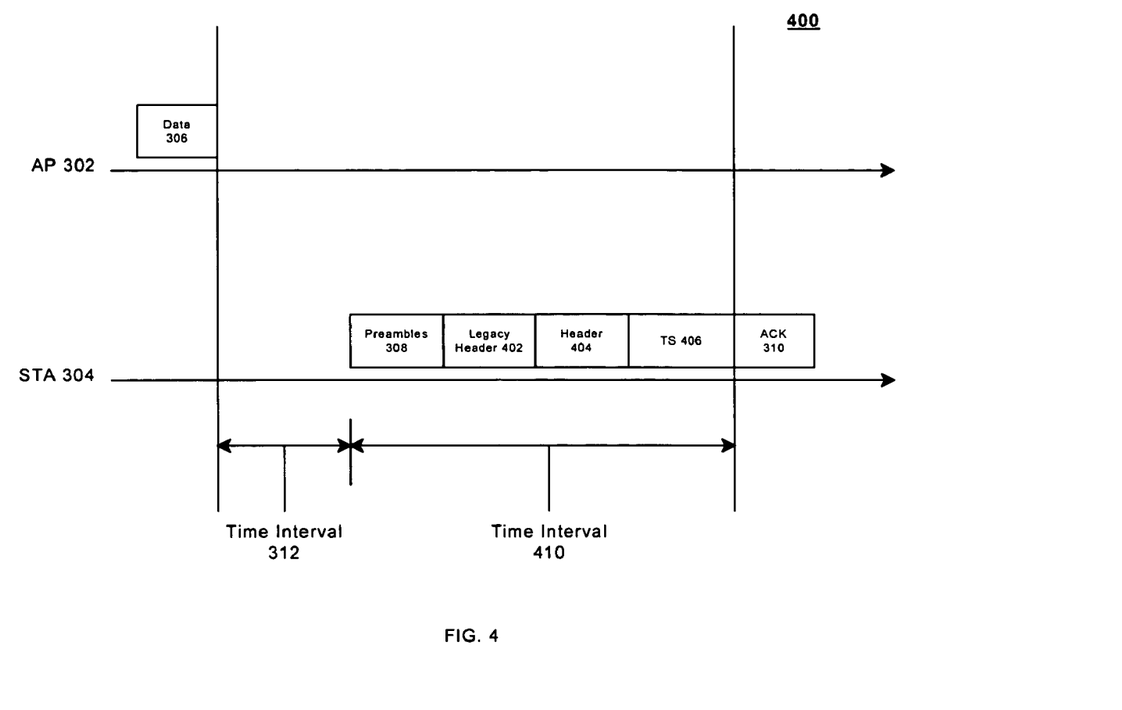
FIG. 4 illustrates a timing diagram 400.

FIG. 4 illustrates a timing diagram 400. Timing diagram 400 may illustrate another example of a technique that may be used by STA 304 to extend or increase the delay interval to form an extended delay interval, and thereby reduce the possibility of AP 302 unnecessarily retransmitting data unit 306 to STA 304. As shown in timing diagram 400, AP 302 may send data unit 306 to STA 304. STA 304 may not have sufficient time to send ACK 310 during time interval 312. STA 304 may attempt to extend time interval 312 by an additional amount of time, as represented by time interval 410. STA 304 may accomplish this by sending legacy information, such as an IEEE 802.11n legacy header 402. For example, STA 304 may send preambles 308, legacy header 402, an IEEE 802.11n PHY header 404, and/or one or more IEEE 802.11n training symbols (TS) 406, during time interval 312. Sending such information during time interval 312 may occur even though data unit 306 has not yet been fully received and verified by STA 304.

In one embodiment, for example, legacy header 402 may comprise any header or signal field for a protocol that is different from the protocols used by AP 302 and/or AP 304. For example, if AP 302 and STA 304 are arranged to communicate using the IEEE 802.11n Standard Protocol, legacy header 402 may include an IEEE 802.11a signal field, sometimes referred to as a legacy "spoofing" header. In some cases, legacy header 402 may be defined by the same protocol used by AP 302 and STA 304. For example, the IEEE 802.11n Standard Protocol defines a legacy header suitable for use with legacy devices communicating with the 802.11n network. Examples of legacy devices may include devices having a single transceiver and therefore incapable of operating in a MIMO operating mode, such as devices arranged to operate in accordance with IEEE 802.11a, 802.11b and 802.11g, for example. The embodiments are not limited in this context.

AP 302 may begin receiving preambles 308, legacy header 402, PHY header 404, and/or one or more TS 406 from STA 304. AP 302 may defer retransmitting data unit 306 by an amount of time represented by time interval 410. This may give STA 304 additional time to receive data unit 306 using iterative demodulation techniques. In one embodiment, for example, time interval 312 may comprise an initially allocated delay interval of approximately 16 μs. Time interval 410 may comprise an additional approximately 32+N μs, with N representing some integer times a symbol duration. Thus, N may account for the number of training symbols sent with TS 406 by STA 304, with each symbol adding an additional approximately 4 μs. The extended delay interval may therefore comprise approximately 48+N μs (e.g., time interval 312 plus time interval 410). The embodiments are not limited in this context.

If STA 304 receives the complete data unit 306 during time interval 410, STA 304 may send ACK 310. If STA 304 fails to receive the complete data unit 306 during time interval 410, however, STA 304 may refrain from sending ACK 310. If AP 302 fails to receive ACK 310 after receiving the legacy information, AP 302 may assume that data unit 306 has not been properly received by STA 304, and may retransmit data unit 306.

Figure 5:
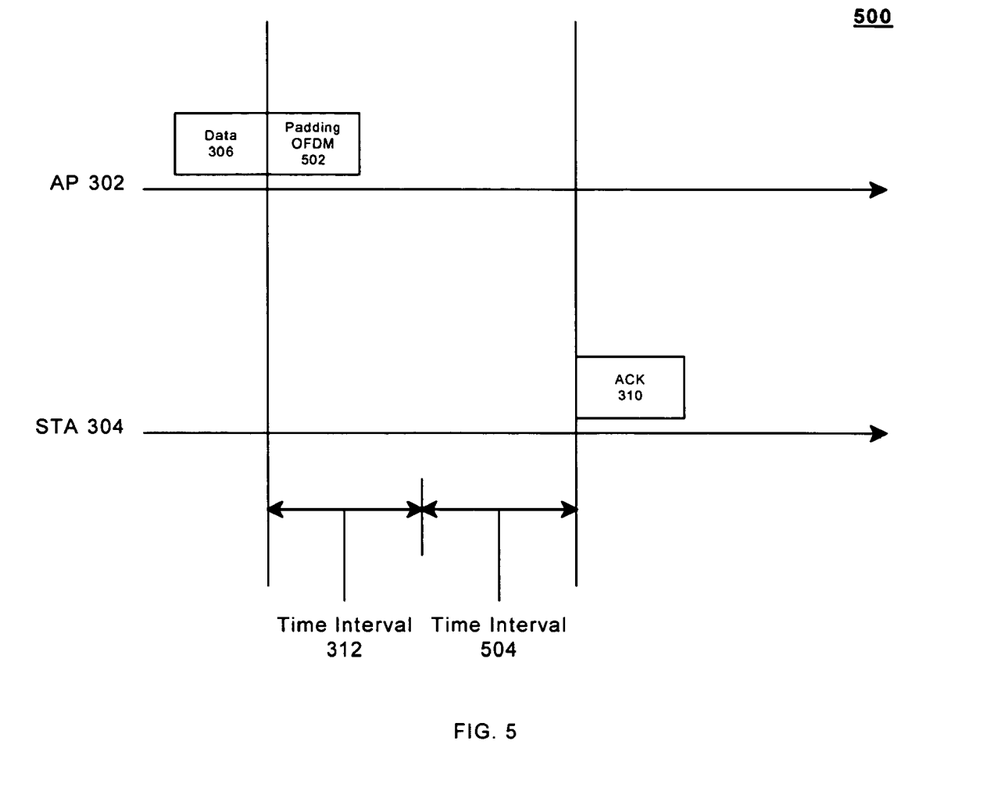
FIG. 5 illustrates a timing diagram 500.

FIG. 5 illustrates a timing diagram 500. Timing diagram 500 may illustrate another example of a technique that may be used by STA 304 to extend or increase the delay interval to form an extended delay interval, and thereby reduce the possibility of AP 302 unnecessarily retransmitting data unit 306 to STA 304. As shown in timing diagram 500, AP 302 may send data unit 306 to STA 304 as with previous embodiments described with reference to FIGS. 3 and 4.

In this embodiment, however, assume AP 302 is made aware of the extended delay interval needed by STA 304 to receive data unit 306. This may occur in a number of different ways. For example, STA 304 may send a message to AP 302 explicitly indicating an extended delay interval needed to receive data unit 306. In another example, AP 302 may measure the amount of time between sending data unit 306 and receiving ACK 310 from previous communications, and uses the measurements to derive an average delay interval. The average delay interval may be used for the extended delay interval, thereby providing a dynamic extended delay interval. In yet another example, AP 302 may use heuristics to determine the extended delay interval based on various environmental, device or system characteristics. In still another example, AP 302 may maintain a table of extended delay intervals associated with a particular device. In yet another example, AP 302 may be programmed with the extended time interval by a user or device. The embodiments are not limited in this context.

Once the extended delay interval for STA 304 is known by AP 302, AP 302 may extend the original delay interval by inserting one or more empty or padding OFDM symbols 502 into data unit 306. For example, padding OFDM symbols 502 may be inserted at the end of data unit 306. Each padding OFDM symbol may add approximately 4 µs to the delay interval, as represented by time interval 504.

Consequently, STA 304 may begin receiving data unit 306. STA 304 may be made previously aware of the padding OFDM symbols used for padding OFDM 502, such as during provisioning of STA 304. Therefore, once STA 304 detects the receipt of padding OFDM symbols 502, through the NAV field in the header for example, it will know that data unit 306 has been completely received and may send ACK 310 during time interval 504.

If STA 304 receives the complete data unit 306 during time interval 504, STA 304 may send ACK 310. If STA 304 fails to receive the complete data unit 306 during time interval 504, however, STA 304 may refrain from sending ACK 310. If AP 302 fails to receive ACK 310 after receiving the legacy information, AP 302 may assume that data unit 306 has not been properly received by STA 304, and may retransmit data unit 306.

Figure 6:
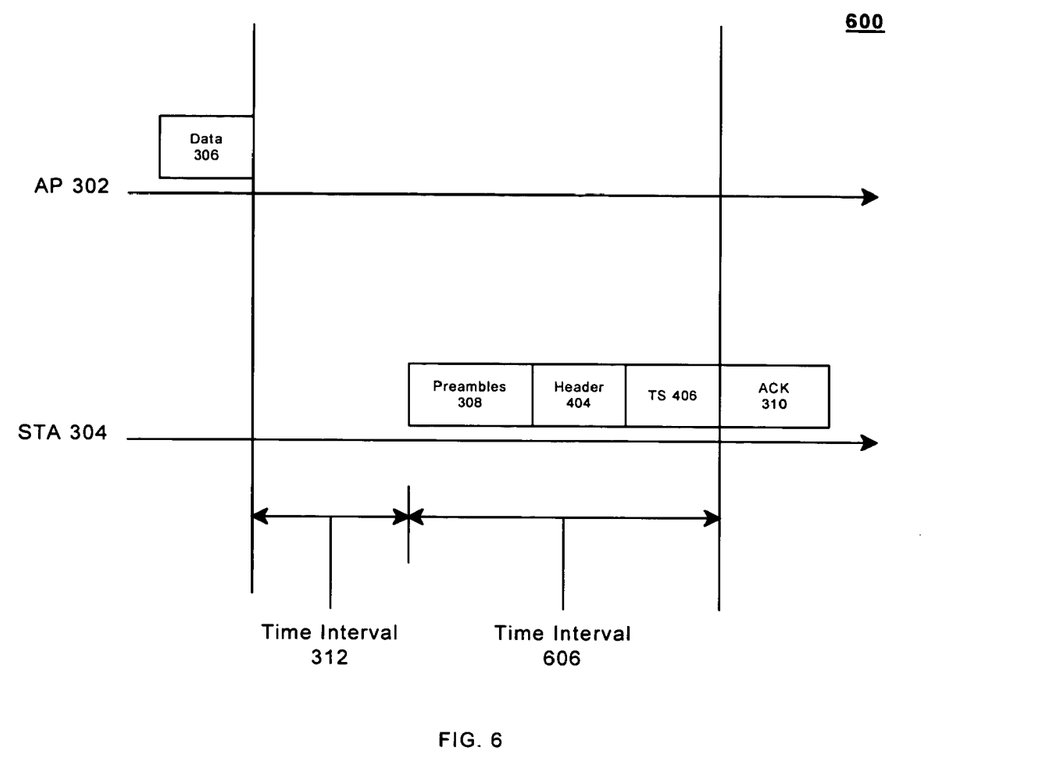
FIG. 6 illustrates a timing diagram 600.

FIG. 6 illustrates a timing diagram 600. Timing diagram 600 may illustrate yet another example of a technique that may be used by STA 304 to extend or increase the delay interval to form an extended delay interval, and thereby reduce the possibility of AP 302 unnecessarily retransmitting data unit 306 to STA 304. As shown in timing diagram 600, AP 302 may send data unit 306 to STA 304. STA 304 may not have sufficient time to send ACK 310 during time interval 312. STA 304 may attempt to extend time interval 312 by an additional amount of time, as represented by time interval 606.

STA 304 may accomplish this by, for example, switching transceiver array 230 to a MIMO operating mode. Since the packet length of ACK 310 is relatively short, STA 304 typically attempts to send ACK 310 in a SISO operating mode to reduce preamble overhead. In order to increase the delay interval, however, STA 304 may switch transceiver array 230 to a MIMO operating mode to send ACK 310. This may be accomplished by enabling two or more receivers from MIMO system 230 via switch 220. The term "enabling" or "enable" or its variations as used herein may refer to turning on or providing power to a transceiver to place it in an operating state. In a MIMO operating mode, STA 304 may send preambles 308, PHY header 404, and one or more TS 406 for each spatial channel. The time interval used to send each TS 406 may comprise, for example, approximately 4 µs. The embodiments are not limited in this context.

AP 302 may begin receiving preambles 308, PHY header 404 and TS 406 from STA 304. AP 302 may defer retransmitting data unit 306 by an amount of time represented by time interval 606. This may give STA 304 additional time to receive data unit 306 using iterative demodulation techniques. In one embodiment, for example, time interval 312 may comprise an initially allocated delay interval of approximately 16 µs, while time interval 606 may comprise an additional approximately 24+N µs, thereby providing an extended delay interval of approximately 40+N µs (e.g., time interval 312 plus time interval 606). The embodiments are not limited in this context.

If STA 304 receives the complete data unit 306 during time interval 606, STA 304 may send ACK 310. If STA 304 fails to receive the complete data unit 306 during time interval 606, however, STA 304 may refrain from sending ACK 310. If AP 302 fails to receive ACK 310 after receiving the legacy information, AP 302 may assume that data unit 306 has not been properly received by STA 304, and may retransmit data unit 306.

In addition to the embodiments described with reference to FIGS. 3-6, it may be appreciated that the various embodiments may be combined in various ways to extend the delay interval. The embodiments are not limited in this context.

Operations for the above embodiments may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 7:
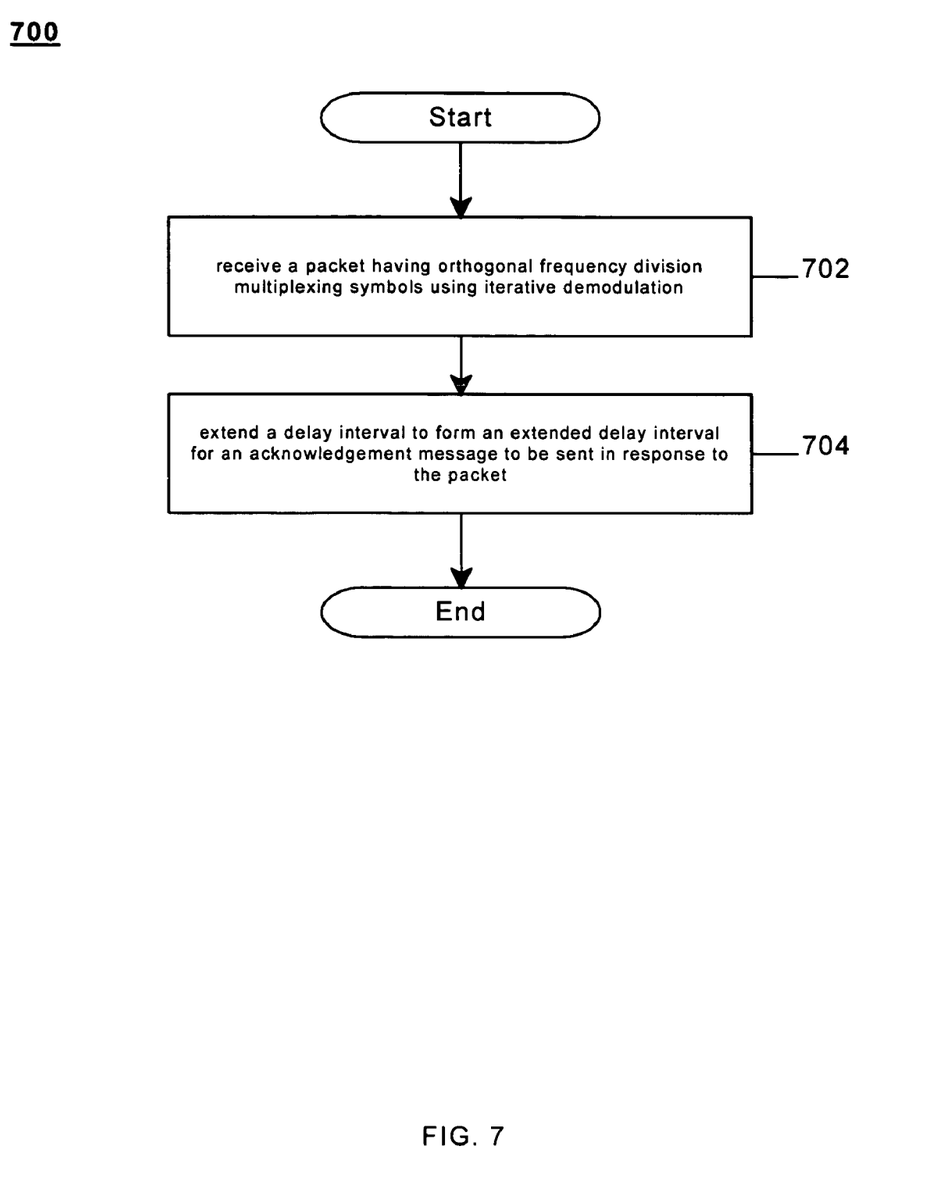
FIG. 7 illustrates a programming logic 700.

FIG. 7 illustrates a programming logic 700. Programming logic 700 may be representative of the operations executed by one or more systems described herein, such as node 200 as implemented as part of AP 302, for example. As shown in programming logic 700, a packet having OFDM symbols may be received using iterative demodulation at block 702. A delay interval may be extended to form an extended delay interval for an acknowledgement message to be sent in response to the packet at block 704.

In one embodiment, the delay interval may be extended by sending a preamble for the acknowledgement message during the delay interval. A determination may be made as to whether the packet has been completely received. The acknowledgement message may be sent in response to the packet if the packet has been completely received.

In one embodiment, the delay interval may be extended by selecting a MIMO operating mode. The acknowledgement message may be sent in response to the packet using the MIMO operating mode.

In one embodiment, the delay interval may be extended by sending legacy information during the delay interval. A determination may be made as to whether the packet has been completely received. The acknowledgement message may be sent in response to the packet if the packet has been completely received.

Figure 8:
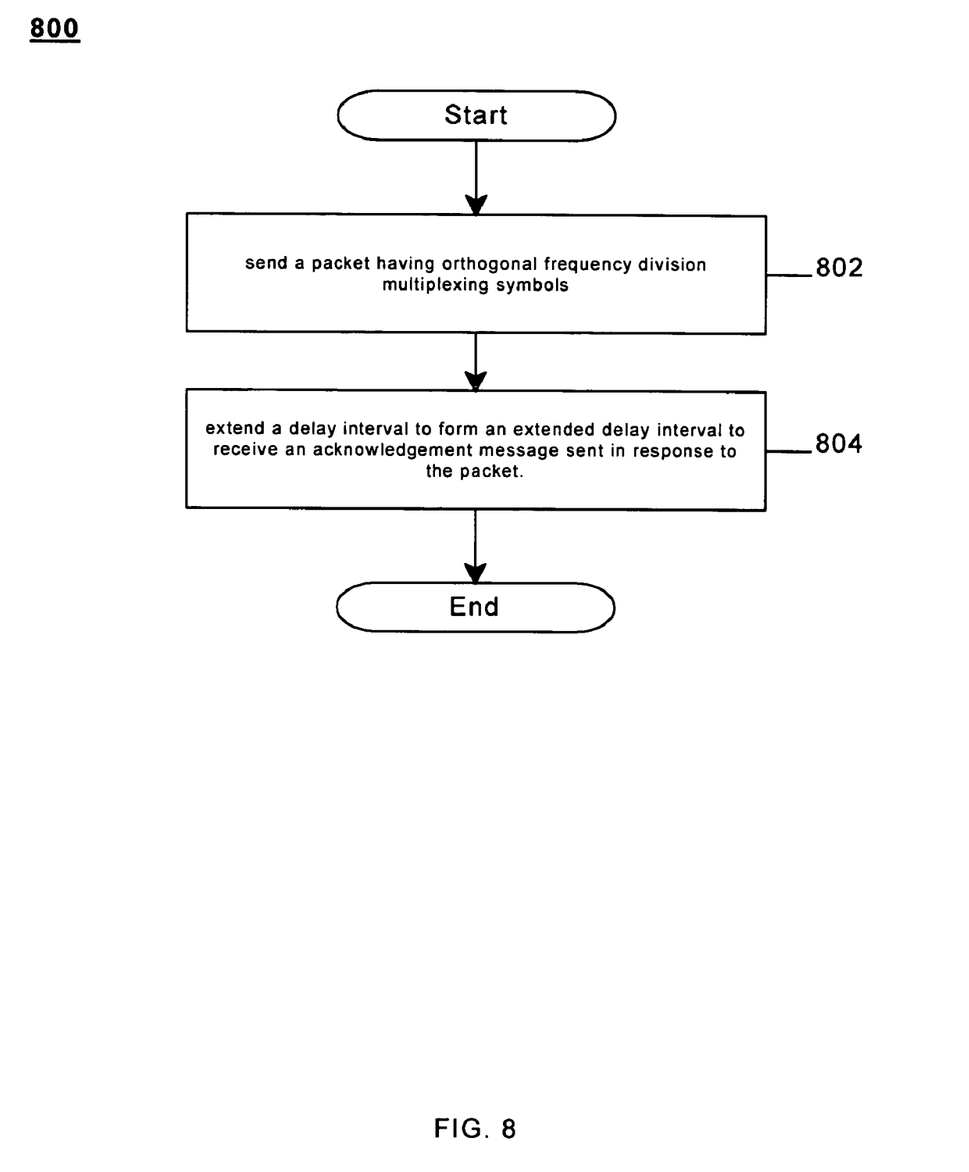
FIG. 8 illustrates a programming logic 800.

FIG. 8 illustrates a programming logic 800. Programming logic 800 may be representative of the operations executed by one or more systems described herein, such as node 200 as implemented as part of STA 304, for example. As shown in programming logic 800, a packet having OFDM symbols may be sent at block 802. A delay interval may be extended to form an extended delay interval to receive the acknowledgement message sent in response to the packet at block 804.

In one embodiment, the delay interval may be extended by receiving a preamble for said acknowledgement message during the delay interval. The delay interval may be extended to form the extended delay interval in response to receiving the preamble. Resending the packet may wait until the extended delay interval has expired.

In one embodiment, the delay interval may be extended by receiving the acknowledgement message in a MIMO operating mode.

In one embodiment, the delay interval may be extended by receiving legacy information during the delay interval. The delay interval may be extended to form the extended delay interval in response to receiving the legacy information. Resending the packet may wait until the extended delay interval has expired.

In one embodiment, the delay interval may be extended by determining an amount of time needed for the extended delay interval. One or more padding OFDM symbols may be inserted in the packet. The packet may be sent with the padding OFDM symbols.

It should be understood that the embodiments may be used in a variety of applications. As described above, the circuits and techniques disclosed herein may be used in many apparatuses such as transmitters and receivers of a radio system. Transmitters and/or receivers intended to be included within the scope of the embodiments may include, by way of example only, WLAN transmitters and/or receivers, MIMO transmitters-receivers system, two-way radio transmitters and/or receivers, digital system transmitters and/or receivers, analog system transmitters and/or receivers, cellular radiotelephone transmitters and/or receivers, and so forth. The embodiments are not limited in this context.

Types of WLAN transmitters and/or receivers intended to be within the scope of the embodiments may include, although are not limited to, transmitters and/or receivers for transmitting and/or receiving spread spectrum signals such as, for example, Frequency Hopping Spread Spectrum (FHSS), Direct Sequence Spread Spectrum (DSSS) OFDM transmitters and/or receivers, and so forth. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a transceiver array having multiple antennas and multiple receivers, said receivers to receive a packet having orthogonal frequency division multiplexing symbols using iterative demodulation; and
a media access controller to connect to said transceiver array, said media access controller to extend a delay interval for an acknowledgement message to be sent in response to said packet by sending a preamble for said acknowledgement message during said delay interval and while the transceiver array is receiving the packet.

2. The apparatus of claim 1, further comprising at least one transmitter to connect to said media access controller.

3. The apparatus of claim 2, wherein said media access controller is to send the preamble for said acknowledgement message during said delay interval using said transmitter to extend said delay interval.

4. The apparatus of claim 3, wherein said media access controller is to determine whether said receivers have received a complete packet, and to send said acknowledgement message when said receivers have received said complete packet.

5. The apparatus of claim 1, further comprising a switch to connect between said media access controller and said transceiver array, said transceiver array to include multiple transmitters.

6. The apparatus of claim 5, wherein said media access controller is to instruct said switch to switch said transceiver array to a multiple-input-multiple-output operating mode, said media access controller to send said acknowledgement message in response to said packet in said multiple-input-multiple-output operating mode using said multiple transmitters.

7. The apparatus of claim 2, wherein said media access controller is to send legacy information during said delay interval using said transmitter, to determine whether said receivers have received a complete packet, and to send said acknowledgement message when said receivers have received said complete packet.

8. An apparatus, comprising:
a transceiver array having multiple antennas and multiple transmitters, said transmitters to send a packet having orthogonal frequency division multiplexing symbols; and
a media access controller to connect to said transceiver array, said media access controller to extend a delay interval to receive an acknowledgement message sent in response to said packet by receiving a preamble for said acknowledgement message during said delay interval and while the packet is being sent.

9. The apparatus of claim 8, further comprising at least one receiver to connect to said media access controller.

10. The apparatus of claim 9, wherein said media access controller is to receive the preamble for said acknowledgement message during said delay interval using from said receiver, extend said delay interval to form an extended delay interval in response to receiving said preamble, and wait to resend said packet until said extended delay interval has expired.

11. The apparatus of claim 8, further comprising a switch to connect between said media access controller and said transceiver array, said transceiver array to include multiple receivers.

12. The apparatus of claim 11, wherein said media access controller is to instruct said switch to switch said transceiver array to a multiple-input-multiple-output operating mode, said transceiver array to receive said acknowledgement message in said multiple-input-multiple-output operating mode using said multiple receivers.

13. The apparatus of claim 9, wherein said media access controller is to receive legacy information during said delay interval using said receiver, extend said delay interval to form said extended delay interval in response to receiving said legacy information, and wait to resend said packet until said extended delay interval has expired.

14. The apparatus of claim 8, wherein said media access controller is to determine an amount of time needed to extend said delay interval to form an extended delay interval, insert one or more padding orthogonal frequency division symbols in said packet, and send said packet with said padding orthogonal frequency division symbols.

15. A system, comprising:
an access point to send a packet having orthogonal frequency division multiplexing symbols;
a station to receive said packet, said station comprising:
a transceiver array having multiple antennas and multiple receivers, said receivers to receive said packet using iterative demodulation; and
a media access controller to connect to said transceiver array, said media access controller to extend a delay interval for an acknowledgement message to be sent to said access point in response to said packet by sending a preamble for said acknowledgement message during said delay interval and while the transceiver array is receiving the packet.

16. The system of claim 15, further comprising at least one transmitter to connect to said media access controller, said media access controller is to send the preamble for said acknowledgement message during said delay interval using said transmitter to extend said delay interval.

17. The system of claim 16, wherein said media access controller is to determine whether said receivers have received a complete packet, and to send said acknowledgement message when said receivers have received said complete packet.

18. The system of claim 15, further comprising a switch to connect between said media access controller and said transceiver array, said transceiver array to include multiple transmitters.

19. The system of claim 18, wherein said media access controller is to instruct said switch to switch said transceiver array to a multiple-input-multiple-output operating mode, said media access controller to send said acknowledgement message in response to said packet in said multiple-input-multiple-output operating mode using said multiple transmitters.

20. The system of claim 16, wherein said media access controller is to send legacy information during said delay interval using said transmitter, to determine whether said receivers have received a complete packet, and to send said acknowledgement message when said receivers have received said complete packet.

21. The system of claim 16, wherein said access point includes a media access controller, said media access controller for said access point to determine an amount of time needed to extend said delay interval to form an extended delay interval, insert one or more padding orthogonal frequency division symbols in said packet, and send said packet with said padding orthogonal frequency division symbols.

22. A method, comprising:
receiving, at a transceiver array, a packet having orthogonal frequency division multiplexing symbols using iterative demodulation; and extending, using a media access controller, a delay interval to form an extended delay interval for an acknowledgement message to be sent in response to said packet by sending a preamble for said acknowledgement message during said delay interval and while the transceiver array is receiving the packet.

23. The method of claim 22, wherein said extending comprises:
determining whether said packet has been completely received; and
sending said acknowledgement message in response to said packet if said packet has been completely received.

24. The method of claim 22, wherein said extending comprises:
selecting a multiple-input-multiple-output operating mode; and
sending said acknowledgement message in response to said packet using said multiple-input-multiple-output operating mode.

25. The method of claim 22, wherein said extending comprises:
sending legacy information during said delay interval;
determining whether said packet has been completely received; and
sending an acknowledgement message in response to said packet if said packet has been completely received.

26. A method, comprising:
sending, from a transceiver array, a packet having orthogonal frequency division multiplexing symbols; and
extending, using a media access controller, a delay interval to form an extended delay interval to receive an acknowledgement message sent in response to said packet by receiving a preamble for said acknowledgement message during said delay interval and while the packet is being sent.

27. The method of claim 26, wherein said extending comprises:
extending said delay interval to form said extended delay interval in response to receiving said preamble; and
waiting to resend said packet until said extended delay interval has expired.

28. The method of claim 26, wherein said extending comprises receiving said acknowledgement message in multiple-input-multiple-output operating mode.

29. The method of claim 26, wherein said extending comprises:
receiving legacy information during said delay interval;
extending said delay interval to form said extended delay interval in response to receiving said legacy information; and
waiting to resend said packet until said extended delay interval has expired.

30. The method of claim 26, further comprising:
determining an amount of time needed for said extended delay interval;
inserting one or more padding orthogonal frequency division symbols in said packet; and
sending said packet with said padding orthogonal frequency division symbols.

31. An article, comprising:
a storage medium;
said storage medium including stored instructions that, when executed by a processor, are operable to receive a packet having orthogonal frequency division multiplexing symbols using iterative demodulation, and extend a delay interval to form an extended delay interval for an acknowledgement message to be sent in response to said packet by sending a preamble for said acknowledgement message during said delay interval and while receiving the packet.

32. The article of claim 31, wherein the stored instructions, when executed by a processor, perform said extending using stored instructions operable to determine whether said packet has been completely received, and send said acknowledgement message in response to said packet if said packet has been completely received.

33. The article of claim 31, wherein the stored instructions, when executed by a processor, perform said extending using stored instructions operable to select a multiple-input-multiple-output operating mode, and send said acknowledgement message in response to said packet using said multiple-input-multiple-output operating mode.

34. The article of claim 31, wherein the stored instructions, when executed by a processor, perform said extending using stored instructions operable to send legacy information during said delay interval, determine whether said packet has been completely received, and send an acknowledgement message in response to said packet if said packet has been completely received.

35. An article, comprising:
a storage medium;
said storage medium including stored instructions that, when executed by a processor, are operable to send a packet having orthogonal frequency division multiplexing symbols, and extend a delay interval to form an extended delay interval to receive an acknowledgement message sent in response to said packet by receiving a preamble for said acknowledgement message during said delay interval and while said packet is being sent.

36. The article of claim 35, wherein the stored instructions, when executed by a processor, perform said extending using stored instructions operable to extend said delay interval to form said extended delay interval in response to receiving said preamble, and wait to resend said packet until said extended delay interval has expired.

37. The article of claim 35, wherein the stored instructions, when executed by a processor, perform said extending using stored instructions operable to receive said acknowledgement message in multiple-input-multiple-output operating mode.

38. The article of claim 35, wherein the stored instructions, when executed by a processor, perform said extending using stored instructions operable to receive legacy information during said delay interval, extend said delay interval to form said extended delay interval in response to receiving said legacy information, and wait to resend said packet until said extended delay interval has expired.

39. The article of claim 35, wherein the stored instructions, when executed by a processor, perform said extending using stored instructions operable to determine an amount of time needed for said extended delay interval, insert one or more padding orthogonal frequency division symbols in said packet, and send said packet with said padding orthogonal frequency division symbols.

* * * * *